INVENTORS
LASZLO L. RAKOCZI &
ELI GLOATES
BY Samuel Cole
ATTORNEY

INVENTORS
LASZLO L. RAKOCZI &
ELI GLOATES
BY
[signature]
ATTORNEY

INVENTORS
LASZLO L. RAKOCZI &
ELI GLOATES
BY
Samuel Cohen
ATTORNEY

INVENTORS
LASZLO L. RAKOCZI &
ELI GLOATES
BY Samuel Cole
ATTORNEY

INVENTORS
LASZLO L. RAKOCZI &
ELI GLOATES
BY
Attorney

INVENTORS
LASZLO L. RAKOCZI &
ELI GLOATES
BY Samuel Cohen
Attorney 3,140,464
Patented July 7, 1964

3,140,464

CENTRAL PARITY CHECKER OPERATING FROM AND INTO A DATA TRANSFER BUS

Laszlo L. Rakoczi, Merchantville, and Eli Gloates, Haddonfield, N.J., assignors to Radio Corporation of America, a corporation of Delaware Filed May 31, 1961, Ser. No. 113,678
8 Claims. (Cl. 340—146.1)

The present invention relates to a data processing system and more particularly to new and improved parity generation, masking and merging techniques for a digital computer.

*Brief Description of Problem*

A digital computer includes numbers of subsystems which in one way or another change or modify the word applied to the subsystem. For example, an adder adds an addend word to an augend word and produces a sum word. The modified or the changed word produced by a subsystem does not necessarily have the same parity as the original word. Accordingly, it is necessary to include in each such system a parity generator for generating the correct parity for the modified word.

Parity generators, especially parity generators for large digital computers, include large numbers of stages and are relatively expensive. For example, in the computer to be discussed in more detail later, each parity generator includes 148 transistors. Accordingly, the requirement for a parity generator for each subsystem in a computer which modifies the digits of the word it operates on, increases the expense of the computer. Further, the requirement for generating parity in each subsystem is time consuming.

One object of the present invention is to reduce the number of parity generators required in a computer and thereby to reduce the cost of the computer.

Another object of the present invention is to provide a means in a large computer system for decreasing the time required to generate parity.

Other problems associated with the generation of parity are masking and merging. Masking is a technique which is employed when it is desired to separate a word in a computer into two or more partial words, each of a lesser number of digits than the entire word. For example, an address word may include certain bits which indicate the address of a data word in the computer memory and other bits known as "index" bits which may be employed automatically to modify the address in the instruction word. The address bits may be required to be transmitted to an address register and the index bits to an index register. In such case, the index bits, for example, may be blocked by certain gates ("masked") and the address bits then applied to the address register. Similarly, the address bits may be masked and the index bits applied to the index register. One or both of the partial words may also require the generation of a parity bit prior to further use of the partial word.

As in the case of parity generation discussed above, masking requires computer equipment and computer time. Conventionally, in order to mask a word and to derive therefrom a partial word with the correct parity the full word less its parity digit is temporarily stored in a register in the arithmetic unit of the computer. A second register has zeros applied to the stages of the second register corresponding to the bits which are to be masked in the full word. The outputs of the registers are then applied to a logic function network which performs the "and" function. The partial word produced by this logic function network is then applied to a parity generator stage in the arithmetic unit. The parity bit which is generated and the remainder of the partial word are then applied through the accumulator in the arithmetic unit to the address register in the computer.

An object of this invention is to provide a new and improved masking technique which requires considerably less time and equipment than the one just described.

The term "merging," as used here, refers to a computer technique which is employed to combine two or more partial words into a full word prior to storage of the full word in a register or in the computer memory. Conventionally, merging is performed in the arithmetic unit of the computer. As in the case of masking, the generation of a parity bit is required for the entire word prior to its storage.

An object of the present invention is to provide a new technique for merging two partial words.

Another object of the invention is to provide a system for merging partial words in a computter which requires less time than the merging technique just described.

*Brief Description of the invention*

The present invention employs a parity generator which is common to more than one of the subsystems discussed above. Preferably, only one or two central parity generators are used for the entire computer. The parity generator is connected to one or more buses which transmit data and instruction words between registers in the computer. Parity is generated not at the individual subsystems which modify the words they receive as in the prior art but during the time the modified word is transmitted from one location to another in the computer. Also, as contrasted to the prior art, the masking and merging are not performed in the arithmetic unit but in circuits associated with the central parity geneator. The masking and merging are also performed during the time the data is transmitted from one location to another in the computer.

An important advantage of the present invenion is the considerable saving which is effected in equipment. In the preferred case, only a single central parity generator may be used for an entire computer system whereas previously, in a computer of comparable size, a parity generator was needed in each of the various units which modified or changed the word content. In the computer under discussion this would mean 8 to 16 parity generators, depending upon the number of arithmetic units supplied with the computer, rather than the one unit required by the invention.

Another advantage of the invention is the considerable amount of computer time which is saved by performing the parity generation, masking and merging during the transmission of data rather than in the arithmetic unit. The saving in time obtained by masking and merging "on the run" is discussed in detail later. A brief discussion of the saving in time due to the generation of parity "on the run" follows.

By making the parity generation part of the data transmission, the time required for the generation of the parity bit can be made to coincide with the resetting time of the receiving register. Accordingly, the generation of parity does not require any "extra" time. In the prior art, parity is generated prior to the transmission of the data and, thus, it requires time during which no other computing steps are performed.

As will also be explained in more detail below, a further advantage of generating parity in the way discussed is that the parity generation can be asynchronous. This permits much faster generation of parity as the interval needed to generate parity need not be made the "worst case" time as in clock synchronized parity generators.

*Brief Description of Drawings*

FIG. 3 is a more detailed showing of the gates 58 at the input to the parity generator;

FIG. 8 is a diagram of stages 66, 54 and 90 of FIG. 1.

*General*

Figure 1:
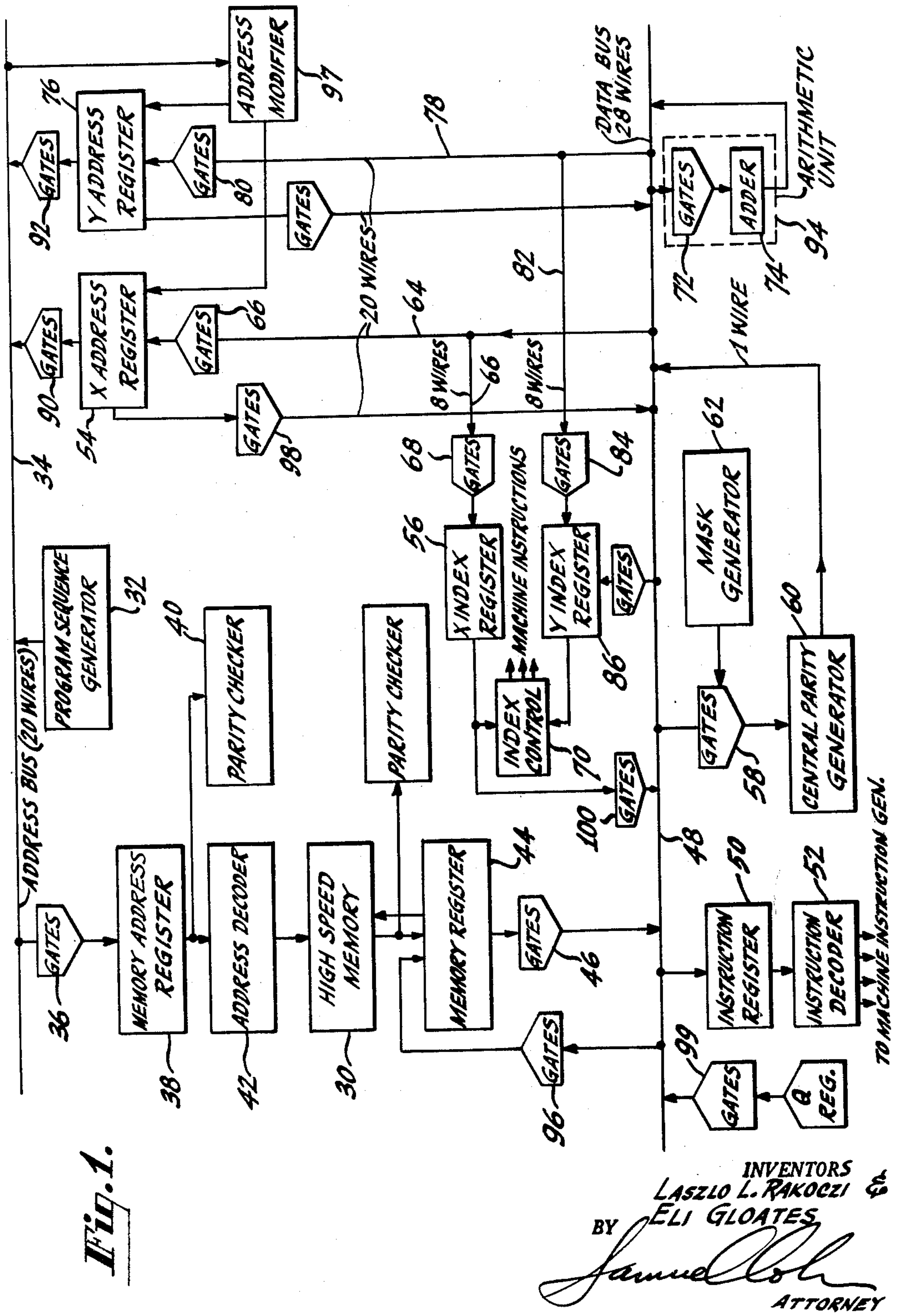
FIG. 1 is a block circuit diagram of a portion which includes the invention of a large scale digital computer.

A number of the blocks shown in the figures above are in themselves known circuits. The circuits of the blocks are actuated by electrical signals applied to the blocks. When the signal is at one level, it represents the binary digit "one" and when it is at another level, it represents the binary digit "zero." For the sake of the discussion which follows, it may be assumed that a high level signal represents the binary digit "one" and a low level signal, the binary digit "zero." Also, to simplify the discussion, rather than speaking of an electrical signal being applied to a block or logic stage, it is sometimes stated that a "one" or a "zero" is applied to the block or stage.

Throughout the figures capital letters are used to represent the signals indicative of binary digits. For example, $D_1$ may represent the binary digit "one" or the binary digit "zero." $\overline{D}_1$ represents the complement of $D_1$. In some cases, capital letters are employed in Boolean equations as a convenient means for succinctly describing circuit operation.

In some cases, combinations of capital letters are used in the description to identify leads and signals. For example, RI is a control signal which enables certain "and" gates when the control signal represents the binary digit "one." Other combinations of letters are identified in the application as they arise.

Throughout the figures a logic circuit known as a multiple input "none" gate is used. A "none" gate produces a "one" output when all of the inputs to the gate are "zero" and a "zero" output when one or more of the inputs are "one." This gate may consist of an "and" gate which has an inverter in series with each of its input leads. Alternatively, a "none" gate may consists of an "or" gate followed by an inverter. Regardless of the way in which the gate is implemented, its Boolean equation in the case in which there are two inputs A and B and one output C is $\overline{A}\overline{B}=C$ or $\overline{A+B}=C$ and the truth table for the gate is:

| A | B | C |
|---|---|---|
| 0 | 0 | 1 |
| 0 | 1 | 0 |
| 1 | 0 | 0 |
| 1 | 1 | 0 |

*Definitions*

A "word" is an ordered set of characters and is the normal unit in which information is stored, transmitted or otherwise operated on in a computer. In the computer of which the present invention is a part, a full word is 56 bits long and a half word 28 bits long. For purposes of simplifying the discussion which follows, only 28 bits are dealt with and accordingly the 28 bits are termed a word. The 28 bit word may be subdivided into nine three bit characters, sometimes known as "octal" characters, and one parity bit.

In illustrating the invention, the flip-flops of a register which stores a word are legended $2^{27}$ flip-flop, $2^{26}$ flip-flop . . . $2^0$ flip-flop. The superscript, in each case, refers to the rank or order of the binary bit stored. The buses which carry a 28 bit word each have 28 wires. Each wire is legended with a number designating the bus, such as 310, followed by a dash, followed by a wire number such as 1. Wire 1 carries the first, that is, the $2^0$ bit; wire 2 carries the second, that is, the $2^1$ bit; wire 28 carries the parity bit, that is, the $2^{27}$ bit.

An "instruction" is a group of words which direct the computer to perform a desired operation. The first word of the instruction in the computer to be discussed is known as an operation word. It includes 24 bits which, generally speaking, indicate the operation to be performed and how it is to be performed. It also includes three bits known as "tag" bits which may be used, for example, to recognize special conditions or for other purposes not pertinent here. The last bit is a parity bit.

One or more words may follow the operation word just described. These are known as address words. In general, 19 of the bits in the address word indicate the location in the memory of a data word upon which an operation such as addition is to be performed. Eight of the other bits in the word are index bits. Generally speaking, these bits are concerned with modification of the address, sometimes called "index control." The 28th or last bit is a parity bit.

Parity check is a method of checking errors in a word or character. The check makes use of a self-checking code in which the total number of "ones" or "zeros" is always even or odd, according to the convention adopted. The parity bit in a word is initially made either a "one" or a "zero" to insure, for example, that the total number of "ones" in the word is odd. If the word is later checked and found to have an odd number of "ones," the parity is correct and it is assumed that there are no errors. The circuit which generates the parity bit is known as a parity generator.

*Overall System*

A portion, which includes the invention, of a large digital computer is shown in block form in FIG. 1. Buses are illustrated in the drawing as single lines, however, it is to be understood that each such bus may consist of a large number of conductors. Further, in the computer under consideration, two buses, one carrying a word and the other the complement of the word, transmit data among the regisers. The complement carrying bus is omitted from FIG. 1 in order to simplify the discussion. It is, however, shown in some of the more detailed drawings which follow FIG. 1.

The individual blocks in the drawing except for the central parity generator and circuits associated with it are in themselves known. For the sake of drawing simplicity, not all of the inputs to or outputs from every block are shown.

The high speed memory 30 may be of the magnetic core or any other well-known type. In the present computer, the portion of the memory shown is capable of storing somewhat over 8,000 words, each of 28 bits. It may be assumed for the purposes of this discussion that instruction words and data words are already loaded into the memory and that the first memory location to be addressed is specified by a register in the program sequence generator.

To start the computer program, the program sequence generator 32 applies to the address bus 34 a word indicative of a desired memory location. This word passes through gates 36 to the memory address register 38. The parity checker 40 associated with the memory address register checks the parity of the word and, if the parity is correct, the word passes to the address decoder 42. The latter selects an instruction from the memory address indicated by the sequence generator.

The first word from the memory in response to the signals applied by the address decoder is the operation word. It passes to the memory register 44 and through gates 46 and data bus 48 to the instruction register 50. In most instances this word remains stored in the register until the operation to which it refers is completed. During the execution of this instruction, as discussed briefly later, the stored word is decoded by the instruction decoder 52. The decoded instruction may be applied to a "machine instruction generator" (not shown) which produces "machine instructions" for various other units in the computer which execute these instructions. The machine instruction generator is roughly comparable to the operations signal generator described by Ledley in Digital Computer and Control Engineering, chapter 17. Typical machine instructions may require the machine (computer) to add or subtract, or multiply or shift two or more words to perform some other logical operation.

After the operation word is stored in the instruction register, the program sequence generator 32 produces another output word (or address)—ordinarily the next one in sequence. This word, as the previous one, passes through the gates 36 to the memory address register 38. There the parity of the word is checked and, if it is correct, the word is passed to the address decoder. The latter selects the proper location in the memory 30 and the memory applies to the memory address register an address word. This word passes through gates 46 to the data bus 48.

The address word is made up of an address partial word and an index partial word. The gates 46 can prevent the parity bit from being applied to the data bus if it is desired that the address partial word, which consists of 19 bits, and the correct parity bit of this partial word, be applied to one of the address registers. (Details of the circuit are given later.) It may arbitrarily be assumed that this first partial word is to be applied to the X address register 54. It is desired that the index partial word be applied to one of the index registers, for example, the X index register 56. This function requires masking.

According to the present invention, the address word on bus 48 is applied in part through gates 58 to a parity generator 60 which is common to the entire computer. The mask generator 62 applies inhibit voltages to the $2^{19}$–$2^{26}$ ones of the gates in block 58. These gates are connected to the wires which carry the index bits. Accordingly, only the address bits, that is, the $2^0$–$2^{18}$ bits pass through the gates to the central parity generator 60.

The central parity generator 60 generates the correct parity bit for the $2^0$–$2^{18}$ bits, that is, for the address partial word. This parity bit plus the 19 address bits are applied from bus 48 via twenty conductor bus 64 through gates 66 to the X address register 54. The index bits are applied through the eight conductor bus 66 and gates 68 to the X index register 56. These bits do not require the generation of a parity bit because they are not required to address the memory. From the X index register 56, the eight bits are applied to the index control 70. The index control generates machine instructions which go to the arithmetic unit of the computer shown in part at 72, 74. The function of the machine instructions which are applied to the arithmetic unit is to modify the address stored in the address registers, however, since this in itself plays no part in the present invention, it will not be discussed further.

Summarizing briefly the steps so far, the program sequence generator 32 has first directed the selection of an operation word stored in the memory 30. The operation word selected has been stored in the instruction register 50. Next, the program sequence generator 32 has directed the selection of an address word stored in the memory. This address word less the parity bit has been placed on the data bus 48 for transmission in part to one portion of the computer, namely the X address register 54 and transmission in part to another portion of the computer, namely the X index register 56. During the transmission, the index bits in the word have been masked and the correct parity bit generated for the remainder of the word, namely for the address bits in the word. The address portion of the word and the correct parity bit—20 bits in all, have been stored in the X address register and the index portion of the word—eight bits, has been stored in the X index register 56.

After the steps just discussed, it may be necessary to select another address word from the memory and store it in the Y address register 76. The procedure is similar to that already described. The program sequence generator 32 generates the word next in sequence. The address word in the next memory location is thereafter selected, masked in the manner already described and parity generated for the 19 bit address portion of the word. These 19 bits and the parity bit are set via bus 78 and gates 80 to the Y address register 76. The index bits for this half word are sent via bus 82 and gates 84 to the Y index register 86.

The process of removing address words from the memory and storing them prior to the execution of an instruction is termed hereafter a "load machine routine." After this routine has been completed, the next step in the computer operation is in the execution of the instruction. The X address register 54 indicates the address in the memory at which a data word upon which an operation is to be performed is stored. The Y address register 76 does the same thing for a second data word in the memory.

It may be helpful to illustrate the execution of an instruction by a specific example. In this example, it is desired to add the words in memory locations $X_1$–$X_{10}$ to the words in memory locations $Y_1$–$Y_{10}$, respectively, and to store the sums thereby obtained in certain locations in the memory. The X address register and Y address register initially contain the addresses of the words in memory locations $X_1$, $Y_1$. These are applied through gates 90 and 92 and the gates 36, register 38 and decoder 42 to the high speed memory. The data in the desired memory locations is applied through memory register 44 and gates 46 via the bus 48 to the arithmetic unit illustrated by the dashed block 94. The sum may be stored in the accumulator (not shown) of the arithmetic unit and thereafter applied via bus 48 (under the control of any suitable means) through gates 96 and memory register 44 to a desired location in the high speed memory 30.

After the addition step above, certain digits in the operation word in the instruction register 50 direct the instruction decoder 52 to apply signals to the address modifier 97 (upper right) of FIG. 1. The address modifier in turn then applies signals to the X address and Y address registers 54 and 76 to advance the registers by one. The new address recorded in these registers then selects the words in the $X_2$ and $Y_2$ memory locations for addition. The process above is continued until the 10 X words specified are added to the 10 Y words specified and the sums obtained stored in the memory 30.

Another type of instruction may call for the contents of one register such as the X address register 54 to be combined with the contents of another register such as the Q register (shown at the bottom left of FIG. 1). This requires the address portion of the partial word (for example, $2^0$–$2^{18}$) in the X address register 54 to be passed through gates 98 to the first 19 wires of data bus 48. The parity bit may be blocked, for example, by one of the gates 98. Concurrently, the partial word ($2^{19}$–$2^{26}$) stored in the Q register is applied through gates 99 to the next eight wires of the data bus 48. The two partial words are applied through gates 58 to the central parity generator 60. The parity generator generates the correct parity bit $2^{27}$ for the 27 bit word and transmits it to the 28th wire of the data bus 48. The complete word, that is, 27 bits plus the parity bit, passes through gates 96 to the memory register 44 and from the memory register to the location in the high speed memory 30 to which the address decoder 42 directs the information. The address decoder is placed at the correct memory location by the program sequence generator 32.

*Saving of Time With Present Invention*

The parity generation merging and masking techniques just described save a considerable amount of computer time. This may more readily be appreciated by consideration of the prior art load machine routine to be discussed below. The times assumed in the discussion which follows are the actual time delays imparted by the subsystems in the particular computer under discussion.

A typical prior art load machine routine may require the following steps. The time for each step is listed after each step.

(1) Read out the high speed memory location addressed by the program sequence generator 32. Place the address read-out into the memory register 44. Advance the program sequence generator by one digit. Transfer the $2^0$ to $2^{26}$ bits stored in the memory register 44 into an input register (not shown) in the artithmetic unit 94 and the index bits, namely the $2^{19}$ to the $2^{26}$ bits to the X index register 56. (The parity bit $2^{27}$ is not transferred at this time but may be, if desired.) Time=1.5 microseconds.

(2) Mask the $2^{19}$–$2^{26}$ bits stored in the register in the arithmetic unit 94. Time=1 microsecond.

(3) Pass the binary bits which have not been masked from the register in the arithmetic unit 94 through a logic network (not shown) in the arithmetic unit and into the accumulator (not shown) in the arithmetic unit 94. At the same time, generate parity for these unmasked bits and place the parity digit in the accumulator. Time=1.5 microseconds.

(4) Transfer the data from the accumulator into the X address register 54. Time=1.5 microseconds.

(5) Repeat the four steps above for the address to be stored in the Y address register 76. Time=5.5 microseconds.

The total time of executing the load machine routine as described above is 11 microseconds.

According to the present invention, the steps in the load machine routines and the times for performing the steps are as follows.

(1) Read out the high speed memory location addressed by the program sequence generator 32 into the memory 42. Advance the program sequence generator 32 by one digit. Transfer the $2^0$ to $2^{26}$ bits stored in the memory register into the data bus 48. Enable those of the gates 58 corresponding to the $2^0$–$2^{18}$ conductors of the data bus 48 and generate the parity bit for the digits on these conductors onto the $2^{27}$ wire of data bus. Enable gates 66 and 68 so that the data on the data bus passes into the X address register 54 and X index register 56, respectively. Time=1.8 microseconds.

(2) Repeat the steps above for the data to be stored in the Y address register and the Y index register. Time=1.8 microseconds.

As can be seen from the above, the total time for the load machine routine in the present invention is only 3.6 microseconds as contrasted to 11.5 microseconds which would be required if the prior art were followed. The instruction which calls for storing the contents of the address register can be analyzed in a similar manner. When this is done, it is found that with the present invention the instruction execution time is 3.6 microseconds whereas the comparable instruction execution time in the prior art is 9 microseconds.

*Memory Register 44 and Gates 46*

Figure 2:
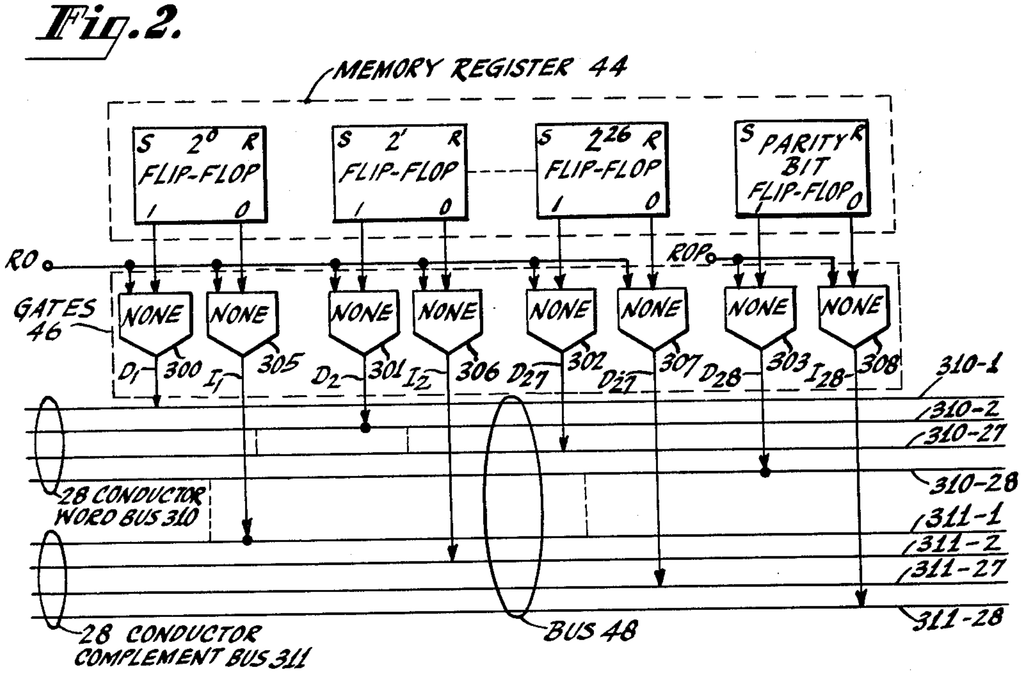
FIG. 2 is a block circuit diagram of the memory register 44 and the word bus and the complement bus connected to the register.

The memory register 44 is shown in FIG. 2 and includes 28 flip-flops, one for each bit of the word. To simplify the discussion, only four of the flip-flops in the register are shown. These are legended $2^0$ flip-flop, $2^1$ flip-flop, $2^{26}$ flip-flop and parity bit ($2^{27}$) flip-flop. Each flip-flop has a 1 output and a 0 output. The convention is adopted (different from some conventions for flip-flops) that when a flip-flop is set, its 0 output produces a binary digit "one" and when the flip-flop is reset, its 1 output produces a binary digit "one."

Below the flip-flops are four "none" gates 300, 301, 302 and 303, each connected to the 1 terminal of a flip-flop and four "none" gates 305, 306, 307 and 308, each connected to a 0 terminal of a flip-flop. The "none" gates 300–303 apply their outputs to the conductors of a bus 310. This bus and the complement bus 311 shown below bus 310 each have 28 conductors, however, only four of the conductors are shown. The "none" gates 305–308 apply their outputs to the conductors of the complement bus 311. The two buses 310 and 311 together make up the bus 48 shown in FIG. 1. Bus 310 carries the D bits of a word; bus 311 carries the complement of the word.

The "none" gates 300–308 are two input "none" gates. One of the inputs has already been described. The second input to "none" gates 300–302 and 305–307 is a binary digit RO (read-out command) which arrives from the central control area of the computer. RO is normally a "one" so that the "none" gates specified are normally inactivated. When it is desired that a "none" gate be placed in condition to conduct, RO is changed from "one" to "zero."

The second input to "none" gates 303 and 308 is a control pulse ROP. In the system discussed above, it is desired that the parity bit in the memory register not be applied to bus 48. Accordingly, in this mode of operation, ROP is maintained "one" when RO is changed to "zero."

In operation, assume that the $2^0$ flip-flop represents "one" and the $2^1$ flip-flop, "zero." This means that the $2^0$ flip-flop has been set whereas the $2^1$ flip-flop remains reset. When the $2^0$ flip-flop is set, a "zero" output appears at its 1 terminal. When RO changes to "zero," gate 300 conducts, and a "one" output is applied to conductor 310–1. In a similar manner, a "zero" output is applied to conductor 311–1 of bus 311. It can also be shown that when gate 301 is enabled by RO, it does not conduct, and the "zero" stored in the $2^1$ flip-flop is applied to conductor 310–2. At the same time, gate 306 does conduct and a "one" is applied to conductor 311–2 of the complement bus 311. The remaining gates operate in a similar manner.

In some forms of the present invention, both RO and ROP are made "zero" simultaneously. This means that the stored parity bit is applied to the appropriate wires of bus 48. In this event, when it is desired to mask a word and to generate a parity for a partial word, the parity bit on bus 48 is ignored. Moreover, the parity bit which is generated for the partial word is applied to a separate wire. This separate wire is connected to the address register. However, since the principle of operation of this other embodiment and the embodiment illustrated is the same, this other embodiment is not discussed further nor is it illustrated.

*Gates 58*

Gates 58 shown in FIG. 1 include 27 inverters and 27 "none" gates for the word bus 310 (FIG. 2) and 54 "none" gates for the complement bus 311 (FIG. 2). For the sake of drawing simplicity, only the stages necessary for four bits of the word and four bits of the complement are illustrated in FIG. 3. The other stages are to be implied from the dashed lines in the figure.

The word bus carries a word made up of D bits. The complement bus carries a word made up of I bits.

In the discussion of the computer shown in part in FIG. 1, it is stated that it is desired to mask the $2^{19}$–$2^{26}$ bits and to transmit the $2^0$ to $2^{18}$ bits to the address registers. A way in which this specific masking operation may be implemented is shown in FIG. 3.

The gates 58 include twenty-seven inverters four of which inverters 320–323, inclusive, are shown. Each inverter is connected to a different conductor of the word bus 310. The respective inverters are each connected a different "none" gate, four of which are 324–327. The conductors of the complement bus 311 are connected to a first group of twenty-seven "none" gates four of which 328–331, respectively are shown. These "none" gates are connected to twenty-seven other "none" gates respectively, four of which 332–335, are shown.

In operation, when the "none" gates 324–327 are enabled, an A output word is produced which is equal to the D input word. Similarly, when the "none" gates represented by stages 328–335 are enabled, a B output word is produced which is equal to the I input word. When the various gates are disabled, the A word equals the B word, equals "zero."

In order to mask the last eight digits of the word, a signal $MA=1$ is applied to input terminals 337 and 338, and a signal $MB=0$ is applied to input terminal 339. The MA and MB signals come from the mask generator 62 of FIG. 1. The $MA=1$ signal inactivates gates 326, 327, 330 and 331 of FIG. 3. Therefore, a "zero" appears at the outputs of these gates. The $MB=0$ signal and the "zero" output of gates 330 and 331 are applied as inputs to "none" gates 334 and 335, respectively. Accordingly, these gates are enabled and 1 appears at the outputs of these gates. The effect of the masking, therefore, is to simulate "zeros" for the A bits ($A_{20}$–$A_{27}$) masked (these are the word bits) and to simulate "ones" for the B bits ($B_{20}$–$B_{27}$) masked (these are the complement bits). The A bits, it will be recalled, are ordinarily equal to the corresponding D bits.

Figure 9:
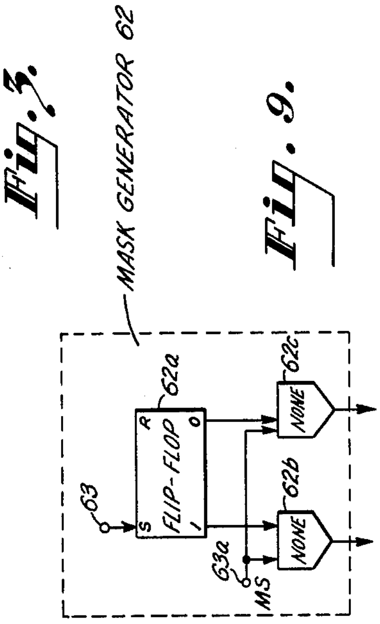
FIG. 9 is a more detailed block circuit diagram of the mask generator 62 of FIG. 1.

A simplified circuit for generating the masking bits MA and MB is shown in FIG. 9. The circuit includes a flip-flop 62_a_, a "none" gate 62_b_, connected to the 1 output terminal of the flip-flop, and a "none" gate 62_c_ connected to the 0 output terminal of the flip-flop.

In the operation of the mask generator, the flip-flop 62_a_ initially may be set by a pulse from the control area of the computer which is applied to terminal 63. This causes a "one" to appear at the 0 output terminal and a "zero" to appear at the 1 output terminal. If now the mask signal $MS=0$, which also may be supplied by the control area of the computer, is applied to terminal 63_a_, "none" gate 62_b_ is enabled producing a $MA=1$ signal. "None" gate 62_c_, however, receives a "one" from the 0 output terminal of the flip-flop so that it remains disabled, producing a $MB=0$ output.

The partial word for which it is desired to generate parity is represented by digits $D_1$–$D_{19}$ and the complement of this partial word by digits $I_1$–$I_{19}$. The word and its complement are applied to the central parity generator 60 by applying a signal $MG=0$ to input terminals 336, 340 and 341. The signal $MG=0$ may be derived from the machine instruction generator discussed previously. This signal enables the first 19 "none" gates corresponding to the 19 digits of the word and the first 38 "none" gates corresponding to the 19 digits of the complement. Two of the former "none" gates, namely 324 and 325 are shown and four of the latter "none" gates 328, 329, 332 and 333 are shown.

Summarizing the above, in order to mask certain bits in a word, "zeros" are simulated for the bits to be masked and "ones" are simulated for the complements of these bits. These "zeros" and "ones" along with the actual bits and their complements of the remainder of the word are applied to the partiy generator discussed below. The complete word looks to the parity generator like any other word.

*Central Parity Generator 60*

Figure 4:
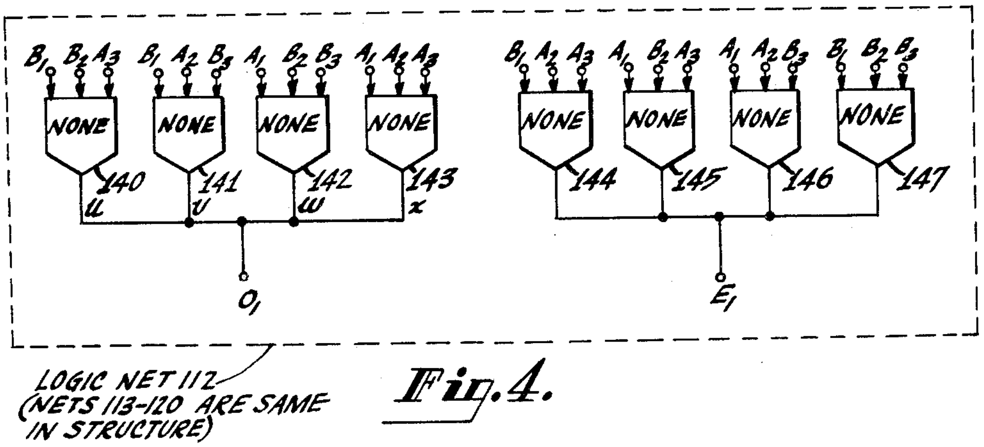
FIGS. 4, 5 and 6 are block circuit diagrams of portions of the parity generator 60.

A first logic net in the central parity generator is shown in FIG. 4 and legended logic net 112. Logic nets 113–120 (FIG. 7) are identical in structure to net 112 but have different binary input bits applied and different outputs. For example, logic net 113 has the binary bits $A_4$, $A_5$ and $A_6$ and $B_4$, $B_5$ and $B_6$ applied and an output $O_2$ and $E_2$. Logic net 114 has the bits $A_7$, $A_8$ and $A_9$ and $B_7$, $B_8$ and $B_9$ applied and so on. This is shown more clearly in FIG. 7 which is discussed later.

The purpose of logic net 112 is to examine the first three bits $A_1$–$A_3$ (the first octal character), and to produce an output which indicates whether there are an odd or an even number of "ones" in these three bits. When one or more of the bits is missing (for example, if $A_1=B_1=0$ this indicates that the $A_1$, $B_1$ bit is missing), $O_1=E_1=1$. Note that when $A_1$ and $B_1$ are both zero, then at least one of $u$, $v$, $w$, $x$ is 1, and at least one of the outputs of gates 144, 145, 146, 147 is 1 (see Equations 1–5 below). When there are an odd number of "ones" in a group of three A bits, E remains "one" and O becomes "zero" and when there are an even number of "ones," then E becomes "zero" and O remains "one."

Logic net 112 includes eight "none" gates 140–147. The first four gates have their outputs connected together and the second four their outputs connected together. Each gate has applied various combinations of A and B inputs taken three at a time and each operates in asynchronous fashion. This operation is described by the following Boolean equations, using logic net 112 as an example and then deriving the general expression for all nets 112–120.

$$O_1=U+V+W+X \quad (1)$$

Substituting A's and B's for U–X gives $$O_1=\overline{B}_1\cdot\overline{B}_2\cdot\overline{A}_3+\overline{B}_1\cdot\overline{A}_2\cdot\overline{B}_3+\overline{A}_1\cdot\overline{B}_2\cdot\overline{B}_3+\overline{A}_1\cdot\overline{A}_2\cdot\overline{A}_3 \quad (2)$$

In like manner $$E_1=\overline{B}_1\cdot\overline{A}_2\cdot\overline{A}_3+\overline{A}_1\cdot\overline{B}_2\cdot\overline{A}_3+\overline{A}_1\cdot\overline{A}_2\cdot\overline{B}_3+\overline{B}_1\cdot\overline{B}_2\cdot\overline{B}_3 \quad (3)$$

It may easily be shown that in the general case $$D_n=\overline{B}_{(3n-2)}\cdot\overline{B}_{(3n-1)}\cdot\overline{A}_{3n}+\overline{B}_{(3n-2)}\cdot\overline{A}_{(3n-1)}\cdot\overline{B}_{3n}+\overline{A}_{(3n-2)}\cdot\overline{B}_{(3n-1)}\cdot\overline{B}_{3n}+\overline{A}_{(3n-2)}\cdot\overline{A}_{(3n-1)}\cdot\overline{A}_{3n} \quad (4)$$

$$E_n=\overline{B}_{(3n-2)}\cdot\overline{A}_{(3n-1)}\cdot\overline{A}_{3n}+\overline{A}_{(3n-2)}\cdot\overline{B}_{(3n-2)}\cdot\overline{A}_{n}+\overline{A}_{(3n-2)}\cdot\overline{A}_{(3n-1)}\cdot\overline{B}_{3n}+\overline{B}_{(3n-2)}\cdot\overline{B}_{(3n-1)}\cdot\overline{B}_{3n} \quad (5)$$

where $n$ is an integer from one to nine. $n=N-111$ where N refers to the logic net from which the O and E terms are derived.

Simply stated, the above equations say that when the three bits of A information and three bits of B information to be examined are present, $E=1$ and $O=0$ when there are an odd number of "ones" and in the three A input bits, and $E=0$ and $O=1$ when there are an even number of "ones" in the three A input bits. The truth table for a logic net, using 112 as an example, is as follows.

| $A_1$ | $A_2$ | $A_3$ | $B_1$ | $B_2$ | $B_3$ | $O_1$ | $E_1$ | Number of ones in A bits | Conducting Gate |
|---|---|---|---|---|---|---|---|---|---|
| 0 | 0 | 0 | 1 | 1 | 1 | 1 | 0 | Even | 143 |
| 0 | 0 | 1 | 1 | 1 | 0 | 0 | 1 | Odd | 146 |
| 0 | 1 | 0 | 1 | 0 | 1 | 0 | 1 | Odd | 145 |
| 0 | 1 | 1 | 1 | 0 | 0 | 1 | 0 | Even | 142 |
| 1 | 0 | 0 | 0 | 1 | 1 | 0 | 1 | Odd | 144 |
| 1 | 0 | 1 | 0 | 1 | 0 | 1 | 0 | Even | 141 |
| 1 | 1 | 0 | 0 | 0 | 1 | 1 | 0 | Even | 140 |
| 1 | 1 | 1 | 0 | 0 | 0 | 0 | 1 | Odd | 147 |

Figure 7:
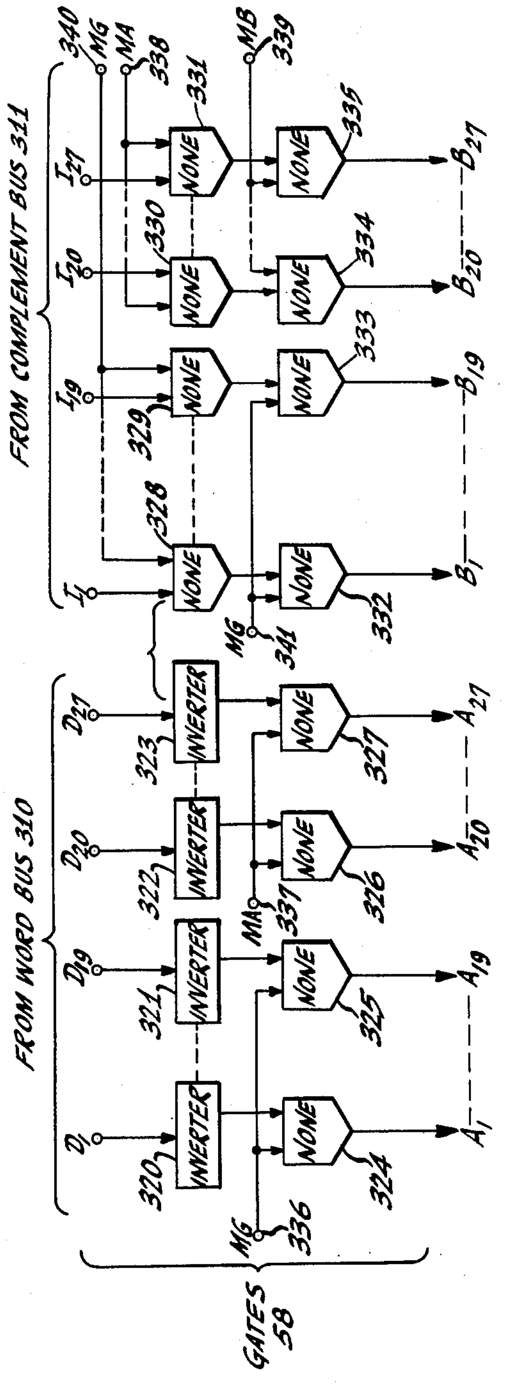
FIG. 7 is a block circuit diagram of the complete parity generator 60.
Figure 5:
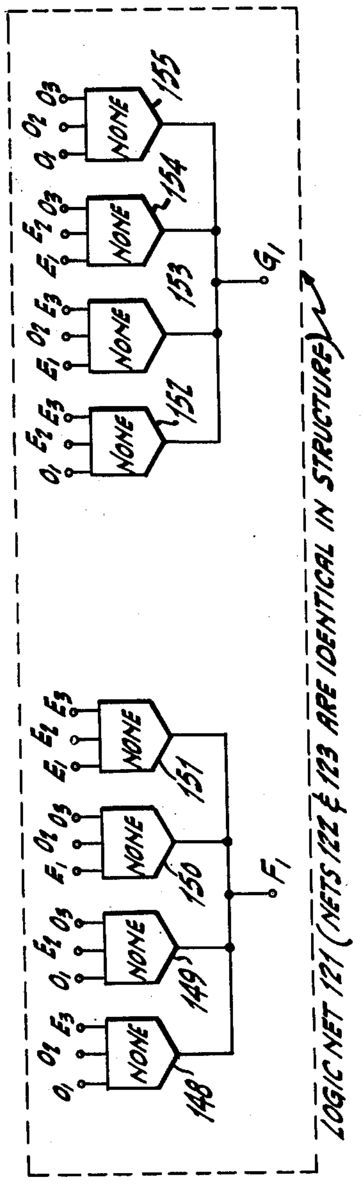

FIG. 5 shows one of the logic nets in the second stage of the parity circuit (FIG. 7). It is legended "Logic Net 121" and includes eight "none" gates 148–155. Logic nets 122 and 123 are identical in structure with logic net 121 but have different inputs and outputs. For example, the inputs to logic net 122 are $O_4$, $O_5$, $O_6$ and $E_4$, $E_5$, $E_6$ and outputs $F_2$ and $G_2$ and the inputs to logic net 23 are $O_7$, $O_8$, $O_9$ and $E_7$, $E_8$, $E_9$. The purpose of these logic nets is to examine the O and E bits three at a time and to determine whether there are an odd or even number of "ones" in these bits. When O and E both equal "one," F and G both equal "zero." When of the three 0 inputs to a logic net the number of "ones" is odd, then F becomes "one" and G remains "zero"; when of the three 0 inputs to the net the number of "ones" is even, then F remains "zero" and G becomes "one." It can also be shown that when one of the three input bits is missing as, for example, when $O_1$ and $E_1$ both equal "one," then the combinations of the remaining two bits such as $O_2$, $O_3$ and $E_2$, $E_3$ are such that $F_1$ and $G_1$ both equal "zero."

The operation of the circuit of FIG. 5 is quite similar to that of the one of FIG. 4. The Boolean expressions defining this operation for net 21 are $$F_1=\overline{O}_1\cdot\overline{O}_2\cdot\overline{E}_3+\overline{O}_1\cdot\overline{E}_2\cdot\overline{O}_3+\overline{E}_1\cdot\overline{O}_2\cdot\overline{O}_3+\overline{E}_1\cdot\overline{E}_2\cdot\overline{E}_3 \quad (6)$$

$$G_1=\overline{O}_1\cdot\overline{E}_2\cdot\overline{E}_3+\overline{E}_1\cdot\overline{O}_2\cdot\overline{E}_3+\overline{E}_1\cdot\overline{E}_2\cdot\overline{O}_3+\overline{O}_1\cdot\overline{O}_2\cdot\overline{O}_3 \quad (7)$$

The general expression is not given but can easily be worked out as is shown in Equations 4 and 5 above.

The truth table for logic net 121 as an example of nets 121–123 is as follows.

| $O_1$ | $O_2$ | $O_3$ | $E_1$ | $E_2$ | $E_3$ | $F_1$ | $G_1$ | Number of ones in O Digits | "None" Gate Conducting |
|---|---|---|---|---|---|---|---|---|---|
| 0 | 0 | 0 | 1 | 1 | 1 | 0 | 1 | Even | 155 |
| 0 | 0 | 1 | 1 | 1 | 0 | 1 | 0 | Odd | 148 |
| 0 | 1 | 0 | 1 | 0 | 1 | 1 | 0 | Odd | 149 |
| 0 | 1 | 1 | 1 | 0 | 0 | 0 | 1 | Even | 152 |
| 1 | 0 | 0 | 0 | 1 | 1 | 1 | 0 | Odd | 150 |
| 1 | 0 | 1 | 0 | 1 | 0 | 0 | 1 | Even | 153 |
| 1 | 1 | 0 | 0 | 0 | 1 | 0 | 1 | Even | 154 |
| 1 | 1 | 1 | 0 | 0 | 0 | 1 | 0 | Odd | 151 |

Figure 6:
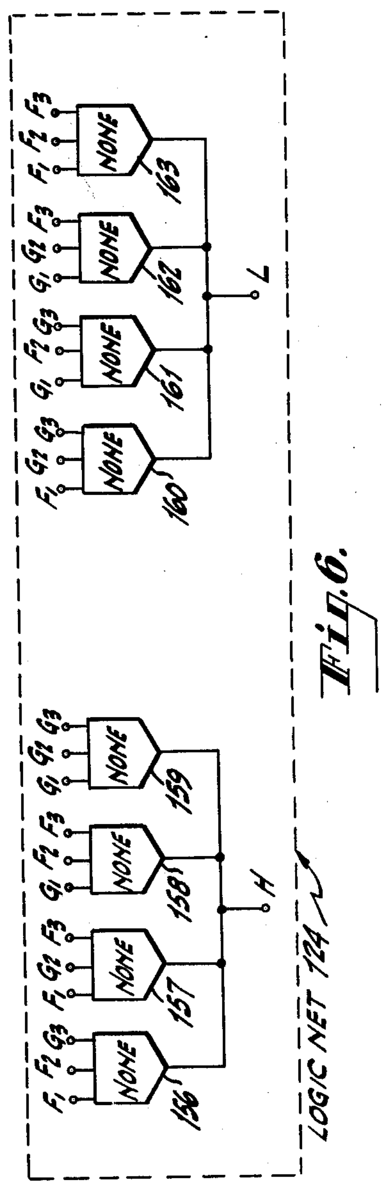
Figure 7:
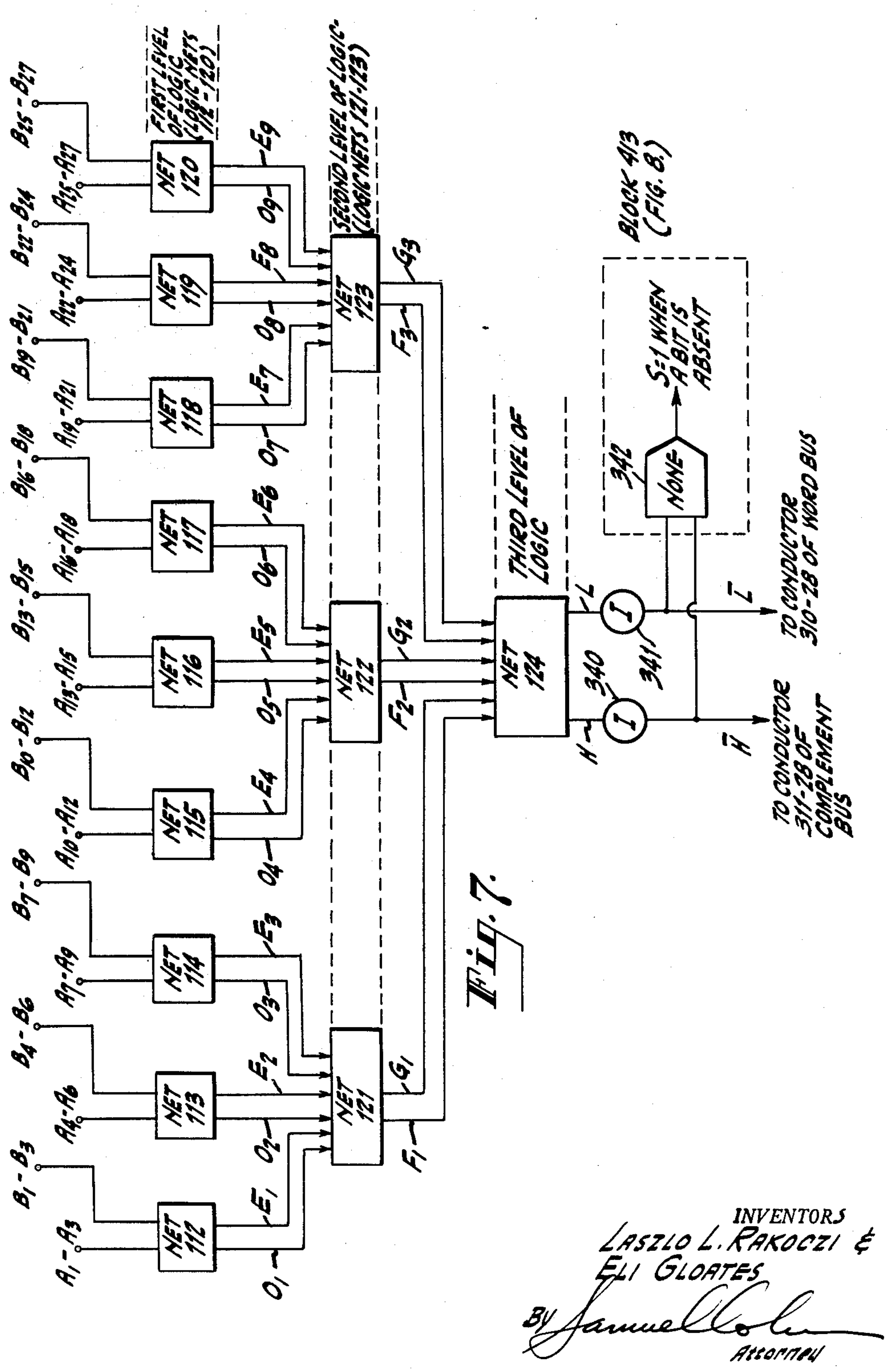

After the operations performed by logic nets 121–123 are completed, there remain two groups of three binary digits $F_1$, $F_2$, $F_3$ and $G_1$, $G_2$, $G_3$. The purpose of the circuit of FIG. 6 is to examine these three digits and to indicate whether there are an odd or an even number of digits in each group. The circuit of FIG. 6 is identical to the one of FIG. 5. It includes eight "none" gates 156–163, respectively, connected in groups of four. Each "none" gate receives different combinations of F and G inputs. The first four "none" gates produce an H output and the second four an L output. When $F=G=0$, $H=L=1$.

The Boolean expressions describing the operation of logic net 124 are:

$$H=\overline{F}_1\cdot\overline{F}_2\cdot\overline{G}_3+\overline{F}_1\cdot\overline{G}_2\cdot\overline{F}_3+\overline{G}_1\cdot\overline{F}_2\cdot\overline{F}_3+\overline{G}_1\cdot\overline{G}_2\cdot\overline{G}_3 \quad (8)$$

$$L=\overline{F}_1\cdot\overline{G}_2\cdot\overline{G}_3\cdot+\overline{G}_1\cdot\overline{F}_2\cdot\overline{G}_3+\overline{G}_1\cdot\overline{G}_2\cdot\overline{F}_3+\overline{F}_1\cdot\overline{F}_2\cdot\overline{F}_3 \quad (9)$$

The truth table for logic net 124 is:

| $F_1$ | $F_2$ | $F_3$ | $G_1$ | $G_2$ | $G_3$ | H | L | Number of ones in $F_1$ Digits | "None" Gate Conducting |
|---|---|---|---|---|---|---|---|---|---|
| 0 | 0 | 0 | 1 | 1 | 1 | 0 | 1 | Even | 163 |
| 0 | 0 | 1 | 1 | 1 | 0 | 1 | 0 | Odd | 156 |
| 0 | 1 | 0 | 1 | 0 | 1 | 1 | 0 | Odd | 157 |
| 0 | 1 | 1 | 1 | 0 | 0 | 0 | 1 | Even | 160 |
| 1 | 0 | 0 | 0 | 1 | 1 | 1 | 0 | Odd | 158 |
| 1 | 0 | 1 | 0 | 1 | 0 | 0 | 1 | Even | 161 |
| 1 | 1 | 0 | 0 | 0 | 1 | 0 | 1 | Even | 162 |
| 1 | 1 | 1 | 0 | 0 | 0 | 1 | 0 | Odd | 159 |

From the equations and truth table above it is clear that when there are an even number of "ones" in the three F inputs, then L remains "one" and H becomes "zero"; and when there are an odd number of "ones" in the three F inputs, then L becomes "zero" and H remains "one." Thus, the 27 bits originally examined have been reduced to a single bit. It can be shown that when these 27 bits are examined three at a time and the resulting nine examined three at a time and the resulting three examined three at a time, as has been done, the final binary bit L which results is "one" when the 27 A bits have an odd number of "ones" and the final output bit L is "zero" when the 27 A input bits have an even number of "ones."

The complete parity system is shown in FIG. 7. The various blocks making up the system except for the circuit which generates the parity bit have already been described in detail and are similarly numbered. The various leads in FIG. 7 sometimes represent a single wire and sometimes several wires. For example, the first lead at the upper left labeled "$A_1$–$A_3$" represents three conductors and the second lead from the left labeled "$B_1$–$B_3$" represents three conductors.

When no information is present in a three bit or "octal" character, then the E and O representing that character are equal to "one." For example, if $A_1=B_1=0$, or $A_2=B_2=0$, or $A_3=B_3=0$, then $O_1=E_1=1$. At other times, E and O are complements.

The function of logic nets 112–120 in the first level of logic is to examine the input digits and their complements three at a time (an octal character at a time) and to produce an output indicating whether there are an odd or an even number of "ones" in the three digits examined. When the three A digits examined have an odd number of "ones," E remains "one" and O becomes "zero."

The purpose of nets 121–123 in the second level of logic is to examine the O digits (and their complements the E digits) three at a time to determine whether there are an odd or an even number of "ones" in the three E digits. When there are an odd number of "ones" in the three E digits examined, G becomes "one," F remains "zero."

The purpose of logic net 124 in the third level of logic is to examine the three F digits (and their complements the three G digits) to determine when there are an odd or an even number of "ones" in the three G digits. When there are an odd number of "ones" in the three G digits, L remains "one" and H becomes "zero."

The word of interest consists of D bits and these are equal to the corresponding A bits. It can be shown that when there are an odd number of "ones" in the 27 A bits examined by the nets discussed above, H is "zero" and when there are an even number of "ones" in the 27 A bits, H is "one." Accordingly, if the odd parity convention is adopted, H can be considered as the parity bit generated for the 27 A bits and, therefore, also for the 27 B bits.

The L bit output of net 124 is applied through an inverter 341 to conductor 310–28 (the parity bit conductor of the word bus). $\overline{L}=H$ and therefore $\overline{L}$ is the parity bit of the B word. In a similar manner, the complement of the H bit obtained by inverter 340 is applied to conductor 311–28 (the parity bit conductor) of the complement bus.

"None" gate 342 is one of the 28 "none" gates in block 413 described more fully hereinafter in connection with FIG. 8. The purpose of this "none" gate and of the others is to determine when a bit is absent. As previously mentioned, if any one of the A or B bits is absent, H and L both remain "one." Under these circumstances, $\overline{H}$ and $\overline{L}$ are "zero." $\overline{H}$ and $\overline{L}$ are the inputs to "none" gate 342 and, therefore, when a bit is missing, "none" gate 342 conducts and produces a $S=1$ output. This indication may be employed to actuate an alarm or in other ways in the computer.

*Partial Address Register*

Figure 8:
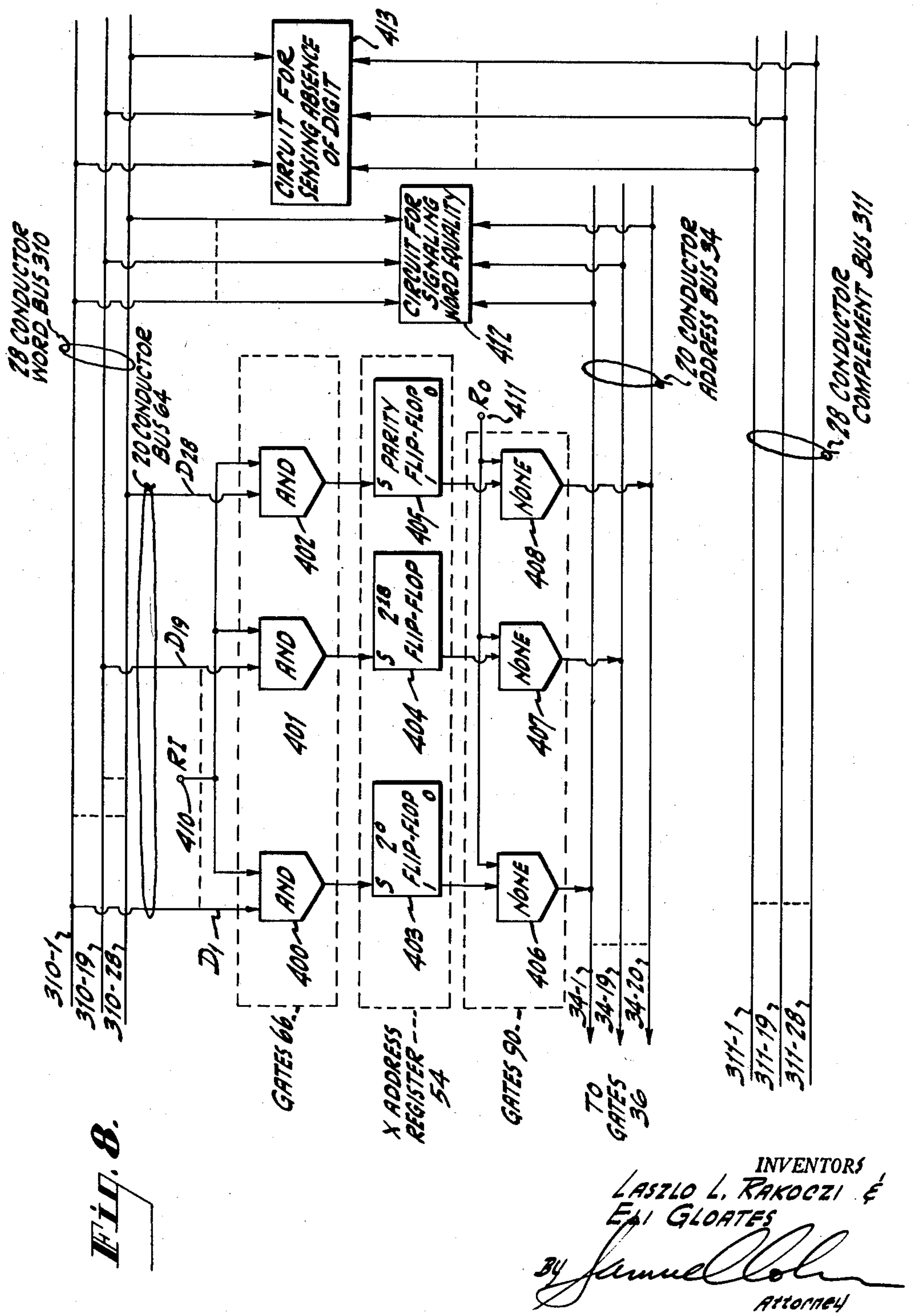
FIG. 8 is a block circuit diagram of a partial register, the input gates to the register, and the output gates from the register. More specifically.

FIG. 8 illustrates by way of example the X address register as the partial register to which the 19 unmasked bits plus the parity bit are transmitted. The gates 66 and 90 at the input and output of the register are also shown.

The 28 conductor word bus 310 is shown at the upper part of the figure. Twenty of the conductors, namely 310–1 through 310–19 and 310–28 carry the word and its parity bit that it is desired to transmit to the partial register. The parity bit, it will be recalled, has been generated "on the run" by the central parity generator 60. These bits are applied through the 20 "and" gates making up gates 66 at the input to the X address register. For the sake of drawing simplicity, only three of these gates, namely 400, 401 and 402 are shown. The gates are connected to the set terminals of the flip-flop making up the X address register 54.

The X address register includes 20 flip-flops, the first 19 for the first 19 bits and the last for the parity bit. Again, for the sake of drawing simplicity, only three of the flip-flops, namely 403, 404 and 405 are shown. The one outputs of the flip-flop are connected through the output gates to a 20 conductor address bus 34. Again, only three gates, namely 406, 407 and 408 of the 20 are shown. These are "none" gates.

In operation, when it is desired to pass a 20 bit word from the word bus to the X address register, the "and" gates 400–402 are enabled by applying a signal $RI=1$ to terminal 410. This terminal is connected to the second input of each "and" gate. At the same time a signal $RO=0$ may be applied to terminal 411. This terminal is connected to the second input of each "none" gate. The function of the $RO=0$ signal is to enable all "none" gates and thereby to apply the word received by the X address register to the address bus 34 leading to the gates 36 of the memory address register.

The circuit illustrated by block 412 compares 20 bits of the word on the word bus with the corresponding bits of the word on the address bus. When the bits are equal, the circuit of block 412 produces an output signal indicating that the register 54 has received all bits correctly. This signal may be employed to terminate the $RI=1$ signal which enables the input "and" gates. The circuit of block 412 forms no part of the present invention but it is described in common assigned application Serial No. 62,644, filed October 14, 1960, by the inventors of the subject matter of the present application. One of the gates in the block, namely the one for sensing the absence of a parity bit, is shown at 342 in FIG. 7.

The complement bus and the word bus are connected to a circuit illustrated by block 413. The function of this circuit is to sense the absence of a bit and thereby to indicate an error in the transmission of the word. This circuit like the one of 412 forms no part of the present invention, however, it, too, is described in the copending application noted above. One stage of this circuit is also described in connection with FIG. 7.

*Merging*

The circuit shown in FIG. 1 is inherently capable of merging two partial words on the run. For example, suppose it is desired to merge a partial word stored in the Q register with one stored in the X address register 54 (FIG. 1). The gates 99 are all enabled permitting the word stored in the Q register to pass to bus 48. Similarly, all the gates 98, except the one corresponding to the parity bit, are enabled permitting the data bits of the partial word in the X address register 54 to be applied to bus 48. The gates 58, shown in more detail in FIG. 3, are all enabled. The bits of the two partial words, therefore, pass through the gates to the central parity generator 60 (FIG. 1) and the central parity generator generates parity for the two partial words. This generated parity bit is applied back to bus 48 in the manner already discussed in detail. The bus now contains the merged word and the parity bit for the merged word.

What is claimed is:

1. In a data processing machine, a plurality of multi-element operating stages, at least one element of at least some of said stages for receiving a parity bit and elements of at least some of said stages for transmitting bits of a word; a bus coupled to all of the stages along which a word, the bits of which are in parallel, may be transmitted among said stages; and a central parity generator common to all of said stages connected at its input and output to said bus for asynchronously generating a parity bit for a word during its transmission along the bus from one of said stages to another and for applying that parity bit to said bus.

2. In a computer, a plural conductor bus, one said conductor for carrying a parity bit, and each of the remaining ones of said conductors carrying the binary bit of a word; a plurality of registers, each coupled to a group of said conductors which includes the conductor for carrying the parity bit, and each register for receiving and storing a partial word and the parity bit of that partial word; a central parity generator which is common to all of said registers for generating the parity bits for the partial words stored in the registers; a plurality of gates, one for each conductor except the conductor for the parity bit, each for passing a different one of said binary bits to said parity generator when said gate is activated; means for masking certain of said bits comprising means for causing the gates corresponding to said bits to generate "zeros"; and a connection from the output of said generator to the conductor of said bus for carrying a parity bit, whereby a group of conductors of said bus carry a partial word and the parity bit for that partial word.

3. In a computer, a bus which carries a word; a central parity generator; gates connected between the conductors of the bus and the parity generator; and means for masking a portion of the word comprising means for causing signals indicative of the binary digit "zero" to be produced at the outputs of the gates which receive the bits to be masked, whereby the parity generator generates a parity bit for the remaining bits of the word.

4. In a computer of the type employing a first bus for carrying the bits of a word and a second bus for carrying the complements of these bits, a first plurality of gates, each for receiving a different one of said binary bits; a second plurality of gates, each for receiving a different one of said complementary bits; a parity generator connected to receive the outputs of all of said gates for generating a parity bit and its complement; and means for masking certain bits of the word comprising means for inactivating the gates corresponding to these bits to thereby produce "zeros" for these bits, and means for activating the gates corresponding to the complements of these bits to thereby produce "ones" for these complementary bits.

5. In a computer, a first plural conductor bus, one said conductor for carrying a parity bit, and each of the remaining ones of said conductors carrying the binary bit of a word; a second plural conductor bus, each conductor for carrying the complement of the bit on the corresponding first conductor of the bus, whereby said second bus carries the complement of said parity bit and word; a plurality of registers, each coupled to a group of said first conductors, and each for receiving a part of said word and the parity bit for said part of said word; a central parity generator which is common to all of said registers for producing parity bits for the parts of the word received by the registers; a plurality of gates, one for each conductor except the parity bit conductor of each bus, each for passing a different one of said binary bits to said parity generator when said gate is activated; means for masking certain of said bits comprising means for causing the gates corresponding to said bits of the word to produce "zeros" and the gates corresponding to said bits of the complement of the word to produce "ones"; and connections from the output of said generator to the conductors of the bus for carrying the parity bit and its complement, respectively, of the word.

6. In a computer, a plurality of stages, some requiring the generation of a parity bit for a word operated on by said stages, and some for storing or otherwise operating on a part of a word; a bus for transmitting bits among stages; and a circuit common to all of the stages coupled to the bus, said circuit including: means for generating a parity bit for a word transmitted between two stages, means for masking a portion of a word transmitted by one of said stages and generating a parity bit for the remaining part of the word destined for another of said stages, and means for merging two partial words transmitted from two of said stages, respectively, and generating a parity bit for the merged word destined for another of said stages.

7. In a computer, two computer stages comprising two registers, each for storing a part of a word; a third computer stage; a bus coupled to the two registers and to the third computer stage for transmitting the two partial words to said third computer stage; and a circuit coupled to the bus for merging the two parts of the word and generating a parity bit for the merged word during the transmission of said merged word along said bus.

8. In a computer, register means for storing words to be added; an adder; second register means for storing sum words; a bus coupled to said first-mentioned register means, said second register means and said adder for transmitting the words to be added to the input circuit of the adder, for receiving the sum word produced by the adder, and for transmitting the sum word to said second register means; and a central parity generator connected to the bus for asynchronously generating a parity bit for the sum word produced by the adder during the transmission thereof between the adder and the second register means.

References Cited in the file of this patent

UNITED STATES PATENTS

| | | |
|---|---|---|
| 2,672,283 | Havens | Mar. 16, 1954 |
| 2,674,727 | Speilberg | Apr. 6, 1954 |
| 2,906,997 | Rabin et al. | Sept. 29, 1959 |
| 2,956,124 | Hagelbarger | Oct. 11, 1960 |
| 3,001,708 | Glaser et al. | Sept. 26, 1961 |

FOREIGN PATENTS

| | | |
|---|---|---|
| 749,836 | Great Britain | June 6, 1956 |